United States Patent [19]

Satoh et al.

[11] Patent Number: 5,444,193
[45] Date of Patent: Aug. 22, 1995

[54] PEN INPUT DEVICE

[75] Inventors: Yasuhiro Satoh; Yoshiyuki Kiyosawa; Yuichi Kimura, all of Natori, Japan

[73] Assignees: Ricoh Company, Ltd., Tokyo; Ricoh Research Institute of General Electronics Co., Ltd., Natori, both of Japan

[21] Appl. No.: 123,229

[22] Filed: Sep. 20, 1993

[30] Foreign Application Priority Data

Sep. 21, 1992 [JP] Japan .................................. 4-251603

[51] Int. Cl.6 .......................... G08C 21/00; G09G 3/02
[52] U.S. Cl. ........................................ 178/18; 345/166
[58] Field of Search ................................. 178/18, 19; 345/156–158, 165, 166, 179, 180, 182, 183, 158; 383/3, 13

[56] References Cited

U.S. PATENT DOCUMENTS

| | | | |
|---|---|---|---|
| 4,546,347 | 10/1985 | Kirsch | 345/166 |
| 4,764,885 | 8/1988 | Greanias et al. | 364/571 |
| 4,794,634 | 12/1988 | Torihata et al. | 379/96 |
| 4,977,315 | 12/1990 | Durcell | 348/182 |
| 5,086,197 | 2/1992 | Liou | 178/18 |

*Primary Examiner*—Stephen Chin
*Assistant Examiner*—Kevin Kim
*Attorney, Agent, or Firm*—Popham, Haik, Schnobrich & Kaufman, Ltd.

[57] ABSTRACT

A pen input device is provided with a tablet having a top surface and a plurality of reference lines provided at a constant pitch on the top surface in mutually perpendicular directions, and a pointing device having a tip end, a first device for irradiating light on the tablet via the tip end, and a second device for detecting a moving direction and a moving quantity of the tip end of the pointing device on the tablet and a distance between the tip end of the pointing device and the top surface of the tablet based on scattered light received from the tablet.

11 Claims, 8 Drawing Sheets

| MOVING DIRECTION OF TIP OF POINTING DEVICE | STATE TRANSITION OF PHOTOELECTRIC CONVERSION ELEMENTS |
|---|---|
| UP | (0,0,-,-) → (0,1,-,-) → (1,1,-,-) → (1,0,-,-) → (0,0,-,-) |
| DOWN | (0,0,-,-) → (1,0,-,-) → (1,1,-,-) → (0,1,-,-) → (0,0,-,-) |
| RIGHT | (-,-,0,0) → (-,-,0,1) → (-,-,1,1) → (-,-,1,0) → (-,-,0,0) |
| LEFT | (-,-,0,0) → (-,-,1,0) → (-,-,1,1) → (-,-,0,1) → (-,-,0,0) |

PEN INPUT DEVICE

BACKGROUND OF THE INVENTION

The present invention generally relates to pen input devices, and more particularly to a pen input device for inputting information such as graphics and characters to a computer or the like.

Conventionally, an input device for inputting information such as graphics and characters to a computer or the like can generally be divided into a first input device which uses a mouse, and a second input device which uses a pressure-sensitive (or contact type) pen tablet.

Presently, the first input device which uses the mouse is popularly used for inputting information to a computer aided design (CAD) system. According to this first input device, the mouse is placed on the tablet and moved manually by the operator, so as to rotate a ball which is provided in the mouse by the friction between the ball and the tablet. The magnitudes of the movement in the vertical and horizontal directions are detected depending on the rotation quantity of the ball, and the detected magnitudes are converted into an electrical signal before being input to the computer. The tablet may take an arbitrary form as long as the surface of the tablet is sufficiently large for enabling rotation of the ball of the mouse when the mouse is moved.

The first input device has a relatively simple construction, and inexpensive first input devices have been produced.

When displaying the position of the mouse on the tablet on a display unit such as a cathode ray tube (CRT) and a liquid crystal display (LCD) by a computer based on the input signal from the first input device, the movement of a point (hereinafter referred to as a cursor) which indicates the position of the mouse on the display unit corresponds one-to-one to the movement of the mouse. Hence, the operator can indirectly confirm the movement of the mouse, that is, the movement of the operator's hand, by monitoring the movement of the cursor displayed on the display unit. As a result, the cursor can be moved in an arbitrary direction in a simple manner, and an arbitrary graphic can be drawn at an arbitrary position on the display unit. In addition, since the movement of the mouse is input to the computer only while the mouse makes contact with the tablet, the cursor can be moved within the entire display area of the display unit to draw the graphic or the like, even if the tablet used is smaller than the display area of the display unit, by repeatedly moving the mouse in the same direction.

On the other hand, the second input device detects the pressure at the tip end of an input pen using a sensor which is mounted on the tablet. Hence, when drawing the graphics or characters on the tablet by the input pen, the locus of the input pen is detected as information which is related to the absolute position on the tablet.

Furthermore, a third input device has recently been proposed in "Information Tool Classified Catalog '92.2" by Sony Corporation. According to this third input device, the device which displays the locus of the input pen and the tablet are stacked. As a result, the locus of the tip of the input pen can be displayed at the same position. In other words, the graphics and characters can be input by the input pen in a sense relatively close to the case where the graphics and characters are written on a paper by a pencil.

However, the first, second and third input devices also have the following drawbacks.

First, according to the first input device, the position of the mouse on the tablet and the position of the cursor on the display unit do not correspond one-to-one. In addition, according to some experts, it is difficult to draw graphics and characters by the mouse when using a CAD or desk top publishing (DTP) software. More particularly, it is simple to draw a large circle or a large character which take up almost the entire display area of the display unit, however, it is difficult to draw small graphics and small characters. It may be regarded that these problems are mainly caused by the shape of the mouse. As may be seen when the mouse is moved to draw a small character, the mouse must be moved by holding the mouse by the entire palm of the operator's hand, and it is for this reason that the mouse cannot be accurately controlled to make fine movements, thereby making accurate input of fine graphics and characters difficult by the mouse.

In addition, drawing a graphic or the like on a paper by a pencil and drawing the graphic or the like by the mouse are quite different in nature. In other words, when drawing the graphic or the like on the paper by the pencil, the pencil frequently repeats contact and separation with respect to the paper. More particularly, the pencil makes contact with the paper when drawing a line, for example, and the pencil can be moved to a different position on the paper by separating the pencil from the paper if no line is to be drawn. On the other hand, in the case of the mouse, the mouse must constantly be in contact with the tablet while supplying the movement of the mouse to the computer. For this reason, a switch is turned ON/OFF to specify whether or not the cursor locus is to be drawn and displayed on the display unit. Therefore, this ON/OFF control of the switch makes the operation of the mouse complex and unsuited for inputting the graphics or the like at a high speed.

Second, the second input device draws the graphics or characters on the tablet by the input pen and detects the locus of the input pen as the information related to the absolute position on the tablet. Hence, when displaying the drawn graphics or characters on the display unit, the position of the cursor displayed on the display unit and the position of the tip of the input pen on the tablet correspond one-to-one, and the drawn graphics or characters can be input as they as to the computer. However, in a case where the tablet and the display unit are separated, the operator must confirm the movement of the input pen by monitoring the movement of the cursor displayed on the display unit. And, in order to do this, the tip of the input pen must constantly be in contact with the tablet. As a result, a problem similar to that encountered in the first input device also exists in the second input device, in that it is necessary to specify whether or not the cursor locus is to be drawn and displayed on the display unit by contacting or separating the tip of the input pen with respect to the tablet.

Third, according to the third input device, the construction is complex and it is difficult to realize a large device. On the other hand, in the case of an electronic pocketbook for inputting characters, for example, it is only possible to input a very limited number of characters, and is unsuited for drawing graphics or the like on a large display unit.

Therefore, there are demands to realize an input device which can overcome the above described problems of the first, second and third input devices.

SUMMARY OF THE INVENTION

Accordingly, it is a general object of the present invention to provide a novel and useful pen input device in which the problems described above are eliminated.

Another and more specific object of the present invention is to provide a pen input device comprising a tablet having a top surface and a plurality of reference lines provided at a constant pitch on the top surface in mutually perpendicular directions, and a pointing device having a tip end, first means for irradiating light on the tablet via the tip end, and second means for detecting a moving direction and a moving quantity of the tip end of the pointing device on the tablet and a distance between the tip end of the pointing device and the top surface of the tablet based on scattered light received from the tablet. According to the pen input device of the present invention, it is possible to detect the movement of the tip of the pointing device even when the tip of the pointing device is separated from the top surface of the tablet by a distance which is within a predetermined range. In addition, it is possible to easily input complicated and minute graphics and characters to a computer.

Other objects and further features of the present invention will be apparent from the following detailed description when read in conjunction with the accompanying drawings.

DESCRIPTION OF THE PREFERRED EMBODIMENTS

Figure 1:
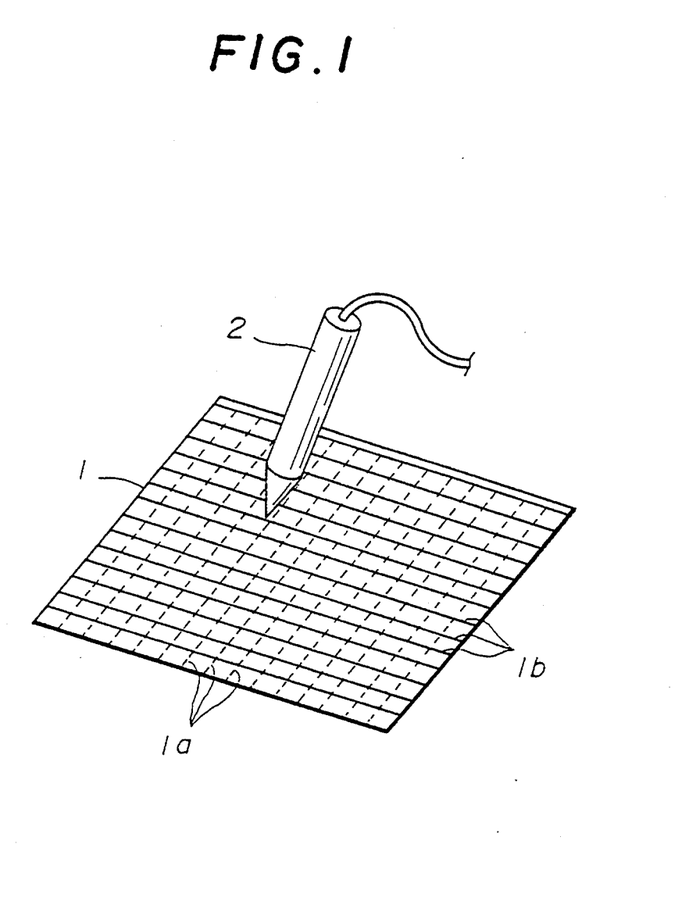
FIG. 1 is a perspective view generally showing a first embodiment of a pen input device according to the present invention.

FIG. 1 is a perspective view generally showing a first embodiment of a pen input device according to the present invention.

In FIG. 1, the top surface of a tablet 1 is made of a material which causes isotropic scattering of light, similarly to the surface of a paper. Reference lines 1a which run in a vertical direction are provided at a constant pitch. In addition, reference lines 1b which run in a horizontal direction perpendicularly to the reference lines 1a are also provided at the constant pitch. For example, the reference lines 1a and 1b are drawn by use of an ink or the like including an organic coloring matter which absorbs light. The reference lines 1a and 1b are provided for the purpose of detecting the relative movement of a tip of a pen-shaped input device (hereinafter simply referred to as a pointing device) 2 with respect to the tablet 1.

The surface of the tablet 1 is flat, thereby enabling various materials to be used for the tablet 1. For example, the tablet 1 may be formed by simply printing the reference lines 1a and 1b on a paper. It is also possible to form the tablet 1 from a plate which is made of a plastic or the like by coating a light scattering material on the surface of the plate and printing the reference lines 1a and 1b on the coated surface of the plate. Furthermore, the tablet 1 may be formed integrally on a display.

The pointing device 2 is shaped like a pen or pencil. Thus, when inputting graphics or the like from the pen input device, the operator can draw the graphics or the like on the tablet 1 by the pointing device 2 in a manner similar to drawing the graphics or the like on a paper by a pen or pencil.

Figure 2:
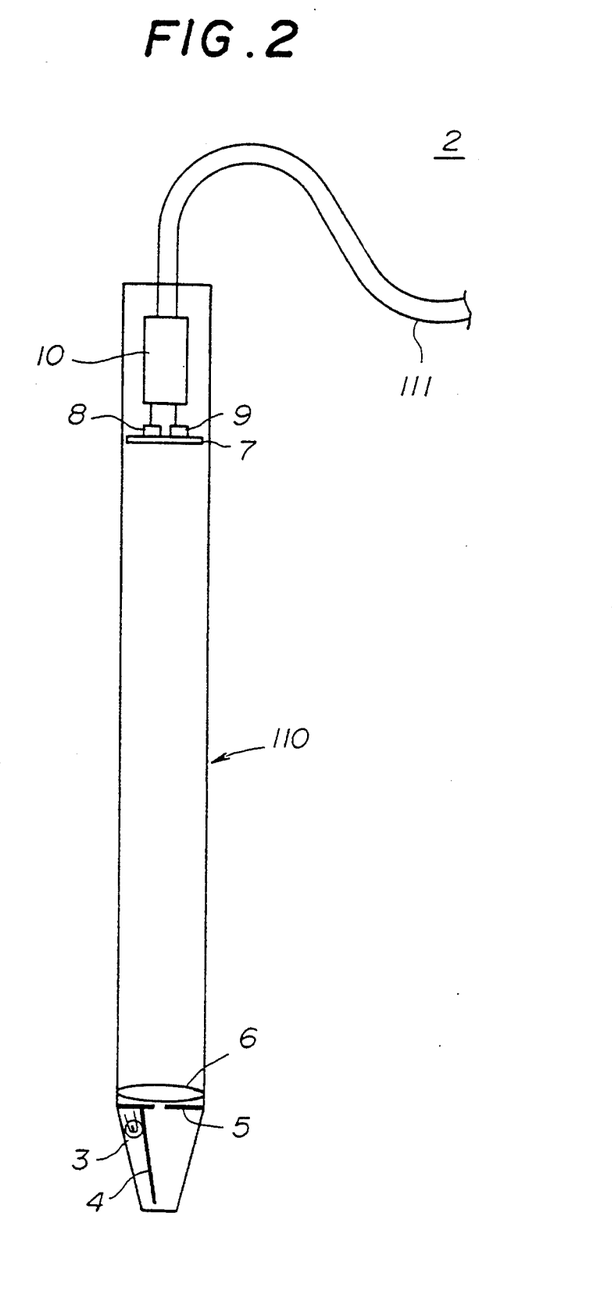
FIG. 2 is a cross sectional view showing an input pen of the first embodiment.

As shown in a cross section in FIG. 2, the pointing device 2 includes a light source 3 for irradiating light on the tablet 1, a light blocking plate 4, a pin-hole plate 5, a lens 6, a screen 7, a plurality of photoelectric conversion elements 8 and 9, and a signal generation circuit 10 which are assembled within a hollow body 110. A slightly pointed tip end of this hollow body 110 is open. On the other hand, an end of a cord 111 is connected to the signal generation circuit 10 at the other end of the hollow body 110. The other end of the cord 111 is connected to a computer (not shown) or the like.

The light emitted from the light source 3 is irradiated on the tablet 1 via the light blocking plate 4 and the tip end opening of the hollow body 110. In addition, the light which is reflected by the tablet 1 converges on the screen 7 via the tip end opening of the hollow body 110, the pin-hole of the pin-hole plate 5 and the lens 6. The image formed on the screen 7 is detected by the photoelectric conversion elements 8 and 9, and output signals of the photoelectric conversion elements 8 and 9 are supplied to the signal generation circuit 10.

When the pointing device 2 moves on the tablet 1, the pointing device 2 basically detects the number of reference lines 1a and 1b traversed by the tip of the pointing device 2 by use of the light, and generates electrical signals indicative of the detected number of reference lines 1a and 1b.

The light which is irradiated on the tablet 1 from the tip of the pointing device 2 is scattered on the surface of the tablet 1. However, the light is absorbed at positions corresponding to the reference lines 1a and 1b and the scattering of light is reduced at these positions. A part of the scattered light from the tablet 1 is converged on the screen 7 via the tip end opening of the hollow body 110, the pin-hole of the pin-hole plate 5 and the lens 6. The image formed on the screen 7 is the same as the image drawn on the surface of the tablet 1.

Figure 3:
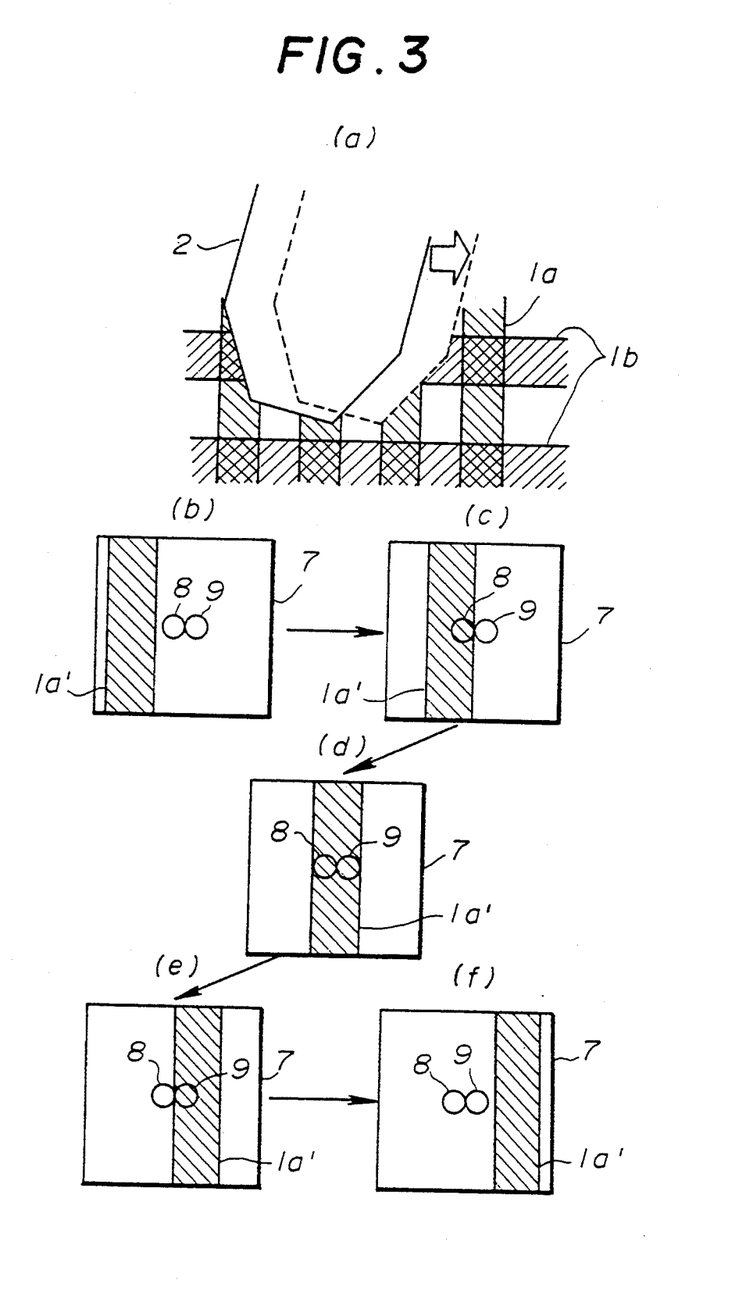
FIG. 3 in parts (a) through (f) is a diagram for explaining the operation of the first embodiment.

If the pointing device 2 moves horizontally on the tablet 1, for example, the moving quantity of the pointing device 2 can be detected as follows. That is, if the pointing device 2 moves horizontally on the tablet 1 as shown in FIG. 3 (a), an image 1a' of the vertical reference line 1a which is provided at the constant pitch on the tablet 1 in the horizontal direction moves on the screen 7 as shown in FIG. 3 (b), (c), (d), (e) and (f). The photoelectric conversion elements 8 and 9 detect this moving image 1a' of the reference line 1a.

In this case, every time the tip of the pointing device 2 traverses one vertical reference line 1a on the tablet 1, the image 1a' of this reference line 1a passes over the photoelectric conversion elements 8 and 9, thereby changing the period of each current flowing through the photoelectric conversion elements 8 and 9. Since the currents flowing through the photoelectric conversion elements 8 and 9 undergo different periodic changes depending on the moving direction of the pointing device 2, the signal generation circuit 10 includes a circuit for generating one electrical pulse with respect to a change of one period of each current flowing through the photoelectric conversion elements 8 and 9 so that the electrical signal corresponding to the moving quantity of the tip of the pointing device 2 is obtained. The resolution with which the movement of the tip of the pointing device 2 is detected is determined by the density with which the reference lines 1a and 1b are provided on the tablet 1.

Because the moving quantity of the tip of the pointing device 2 is detected using the light in a non-contact manner, it is possible to detect the movement of the tip of the pointing device 2 even if the tip of the pointing device 2 is separated from the surface of the tablet 1 to a certain extent. By appropriately selecting the size of the pin-hole in the pin-hole plate 5 and the focal distance of the lens 6, it is possible to detect the movement of the tip of the pointing device 2 even if the tip of the pointing device 2 is separated from the surface of the tablet 1 by several mm, for example.

However, as the tip of the pointing device 2 moves further away from the surface of the tablet 1, the scattered light from the tablet 1 reaching the lens 6 of the pointing device 2 decreases. In this case, the brightness of the entire screen 7 decreases, and the currents flowing through the photoelectric conversion elements 8 and 9 decrease. Hence, the currents flowing through the photoelectric conversion elements 8 and 9 are compared with a predetermined current, and the result of the comparison is used to detect whether the tip of the pointing device 2 is in contact with the surface of the tablet 1 or is separated from the surface of the tablet 1.

The description given above was made for the case where the pointing device 2 moves horizontally on the tablet 1, however, the moving quantity can be detected similarly for the case where the pointing device 2 moves vertically on the tablet 1. Since the reference lines 1a and 1b run in both the vertical and horizontal directions on the tablet 1, it is necessary to determine how the intersection is to be processed. Various methods of processing the intersection of the reference lines 1a and 1b are possible and may be selected depending on the arrangement of the photoelectric conversion elements 8 and 9 and the arrangement of the reference lines 1a and 1b on the tablet 1.

The electrical signals output from the signal generation circuit 10 indicate the moving quantity of the pointing device 2 in the vertical direction (front and rear directions) on the tablet 1, the moving quantity of the pointing device 2 in the horizontal direction (right and left directions) on the tablet 1, and whether the tip of the pointing device 2 is in contact with or is separated from the surface of the tablet 1. These electrical signals from the signal generation circuit 10 are input to the computer (not shown) via the cord 111, and the position of the tip of the pointing device 2 on the tablet 1 is displayed on a display (not shown) by the computer. The position of the tip of the pointing device 2 on the tablet 1 is displayed by a point or cursor on the display. Only the cursor is displayed while the tip of the pointing device 2 is separated from the surface of the tablet 1. On the other hand, the locus of the cursor is also displayed when the tip of the pointing device 2 is in contact with the surface of the tablet 1.

According to this embodiment, the cursor moves on the display depending on the moving direction and the moving distance of the tip of the pointing device 2 on the tablet 1, similarly to the conventional first input device described above using the mouse. Hence, the operator can indirectly confirm the movement of the tip of the pointing device 2 by monitoring the cursor displayed on the display. The relationship between the movement of the tip of the pointing device 2 and the movement of the cursor can be categorized into the following three kinds (1) through (3) by the computer.

(1) The locus of the cursor remains on the display while the tip of the pointing device 2 is in contact with the surface of the tablet 1;

(2) Only the cursor and not the locus is displayed depending on the movement of the tip of the pointing device 2 if the tip of the pointing device 2 is separated from the surface of the tablet 1 by a distance within a range of approximately 5 mm, because the signal generation circuit 10 in this case generates the signal indicating the non-contact state between the tip of the pointing device 2 and the surface of the tablet 1; and (3) The tip of the pointing device 2 can be moved while keeping the cursor stationary on the display if the tip of the pointing device 2 separates from the surface of the tablet 1 by a distance exceeding the above described range of approximately 5 mm, because the signal generation circuit 10 in this case no longer generates the signal indicating the vertical and horizontal movement of the tip of the pointing device 2.

When the operator draws the graphics or the like on the tablet 1 by holding the pointing device 2 by the operator's hand, the palm of the operator's hand on the side of the little finger is always in contact with the surface of the tablet 1. In addition, even when the operator separates the tip of the pointing device 2 from the surface of the tablet 1 and moves the pointing device 2, the tip of the pointing device 2 only separates from the surface of the tablet 1 by a distance of several mm.

Accordingly, in this embodiment, when the operator continues to input the graphics or characters without separating the palm of the operator's hand on the side of the little finger from the surface of the tablet 1, the relationship between the movement of the tip of the pointing device 2 and the movement of the cursor alternately corresponds to one of the states (1) and (2) described above. Hence, the operator can input intermittent graphics while constantly confirming on the display the movement of the tip of the pointing device 2 on the tablet 1, without the need to carry out the troublesome operation of controlling the ON/OFF state of the switch as in the case of the conventional first input device which uses the mouse. Here, the intermittent graphics are referring to images which are not made up of a single line but a combination of a plurality of lines.

In addition, in the state (3) described above, it is possible to move only the pointing device 2. Hence, similarly as in the case of the conventional first input device which uses the mouse, it is possible to input the graphic or the like at an arbitrary position on the tablet 1 that is convenient for the operator to move the operator's hand, by use of the tablet 1 which may be smaller than the display and moving the cursor within the entire display area of the display. Since the tip of the pointing device 2 can be moved within the entire region of the tablet 1, it is possible to draw graphics or the like on a large display using the tablet 1 which is even smaller than the tablet used by the conventional first input device.

Figure 4:
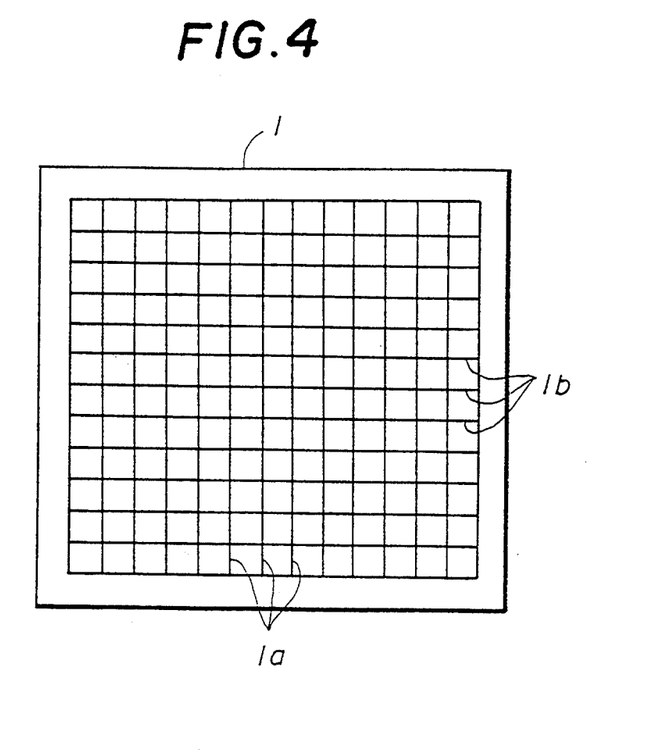
FIG. 4 is a plan view showing a tablet of the first embodiment.
Figure 5:
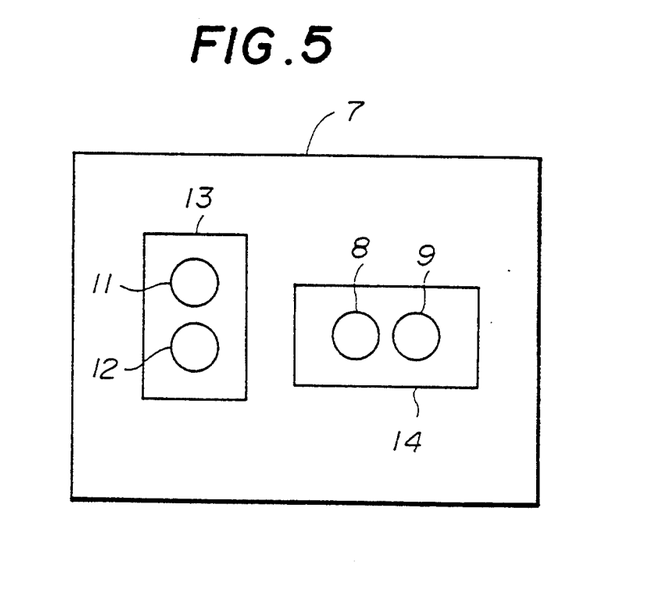
FIG. 5 is a plan view showing an essential part of the input pen of the first embodiment.

FIG. 4 shows a plan view of the tablet 1 used in this embodiment, and FIG. 5 is a plan view showing an essential part of the pointing device 2 used in this embodiment.

This embodiment independently detects the movement of the tip of the pointing device 2 in the vertical direction and in the horizontal direction using light including two wavelengths which are separable in filters 13 and 14 within the pointing device 2. In other words, the movement of the tip of the pointing device 2 in the vertical direction is detected using the light having a wavelength $\lambda_1$, and the movement of the tip end of the pointing device 2 in the horizontal direction is detected using the light having a wavelength $\lambda_0$ which is different from the wavelength $\lambda_1$.

Figure 7:
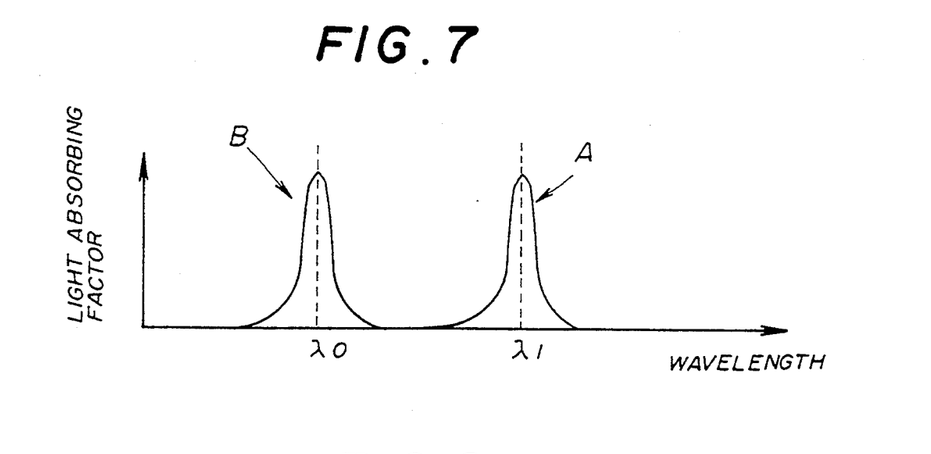
FIG. 7 is a diagram showing light absorption spectrums of reference lines of the tablet in the first embodiment.

In FIG. 4, the reference lines 1a are drawn by an ink or the like including coloring matter which strongly absorbs the light having the wavelength $\lambda_1$. Similarly, the reference lines 1b are drawn by an ink or the like including coloring matter which strongly absorbs the light having the wavelength $\lambda_0$. On the other hand, the tablet 1 itself scatters the light having both the wavelengths $\lambda_1$ and $\lambda_0$. Because only the surface of the tablet 1 needs to scatter the light including the wavelengths $\lambda_1$ and $\lambda_0$, the body of the tablet 1 may be made of any kind of material as long as the surface of the tablet 1 is made of or coated with a material which scatters the light having the wavelengths $\lambda_1$ and $\lambda_0$. As shown in FIG. 7, the reference lines 1a and 1b respectively have light absorption characteristics (spectral characteristics) A and B shown in FIG. 7 for strongly absorbing only the light having the wavelengths in the vicinities of the respective wavelengths $\lambda_1$ and $\lambda_0$.

Figure 6:
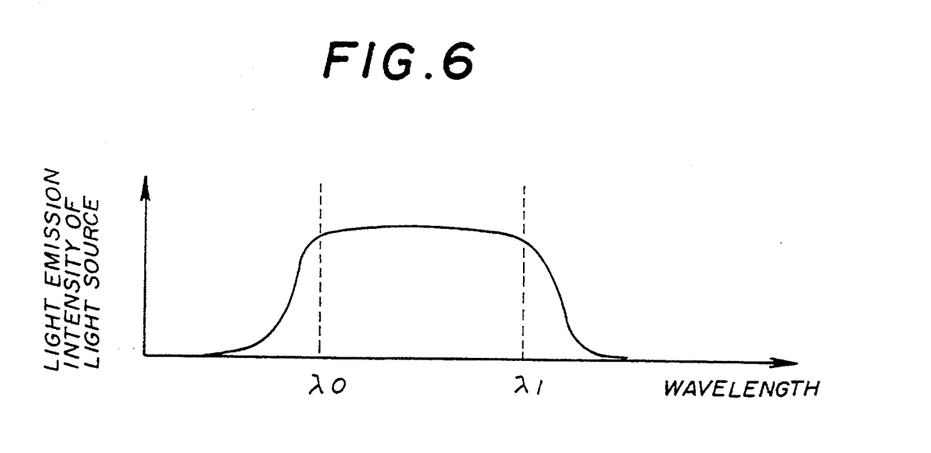
FIG. 6 is a diagram showing a light emission spectrum of a light source in the first embodiment.

As shown in FIG. 6, the light emitted from the light source 3 of the pointing device 2 includes the wavelengths $\lambda_0$ and $\lambda_1$ in the light emission spectrum. For example, the light source 3 may be realized by a tungsten lamp which emits light in a wide wavelength region, a pair of light emitting diodes or semiconductor lasers which emit light in the respective wavelengths $\lambda_0$ and $\lambda_1$.

FIG. 5 shows the arrangement of the filters 13 and 14 provided on the screen 7 and the photoelectric conversion elements 8, 9, 11 and 12. For example, photodiodes are used for the photoelectric conversion elements 8, 9, 11 and 12. The pair of photoelectric conversion elements 8 and 9 are arranged in the horizontal direction at an interval. Similarly, the pair of photoelectric conversion elements 11 and 12 are arranged in the vertical direction at an interval. Hence, the two pairs of photoelectric conversion elements 8 and 9, and 11 and 12, are provided in correspondence with the movements of the pointing device 2 in the vertical and horizontal directions. The filters 13 and 14 are provided so that, the light having the wavelength $\lambda_0$ and the light having the wavelength $\lambda_1$ are independently detected by the pair of photoelectric conversion elements 8 and 9 and the pair of the photoelectric conversion elements 11 and 12. More particularly, the filter 13 which transmits only the light having the wavelength $\lambda_0$ and absorbs the light having the wavelength $\lambda_1$ is arranged between the screen 7 and the pair of photoelectric conversion elements 11 and 12. In addition, the filter 14 which transmits only the light having the wavelength $\lambda_1$ and absorbs the light having the wavelength $\lambda_0$ is arranged between the screen 7 and the pair of photoelectric conversion elements 8 and 9.

Figure 8:
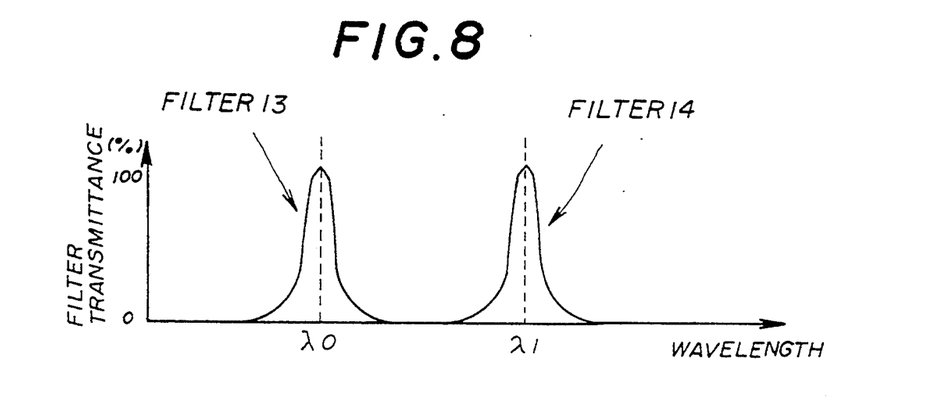
FIG. 8 is a diagram showing a filter transmittance of the first embodiment.

For example, a bandpass filter such as an interference filter may be used for the filters 13 and 14. In addition, if the light source 3 is made up of light emitting diodes or semiconductor lasers which emit lights of two different colors, the filters 13 and 14 simply need to separate the lights having the wavelengths of the two colors, and for this reason, it is possible to use inexpensive highpass filters or lowpass filters such as colored glass filters. As shown in FIG. 8, the filter 13 has a spectral characteristic for transmitting only the light having the wavelength $\lambda_0$, and the filter 14 has a spectral characteristic for transmitting only the light having the wavelength $\lambda_1$.

Next, a description will be given of the operation of this first embodiment.

The light emitted from the light source 3 of the pointing device 2 is irradiated on the tablet 1 via the light blocking plate 4 and the tip end opening of the hollow body 110. A part of this light is scattered by the reference lines 1a and 1b on the tablet 1. The scattered light from the tablet 1 is imaged on the screen 7 via the tip end opening of the hollow body 110, the pin-hole in the pin-hole plate 5 and the lens 6. The image on the screen 7 is detected by the photoelectric conversion elements 8, 9, 11 and 12 via the filters 13 and 14.

Figure 9:
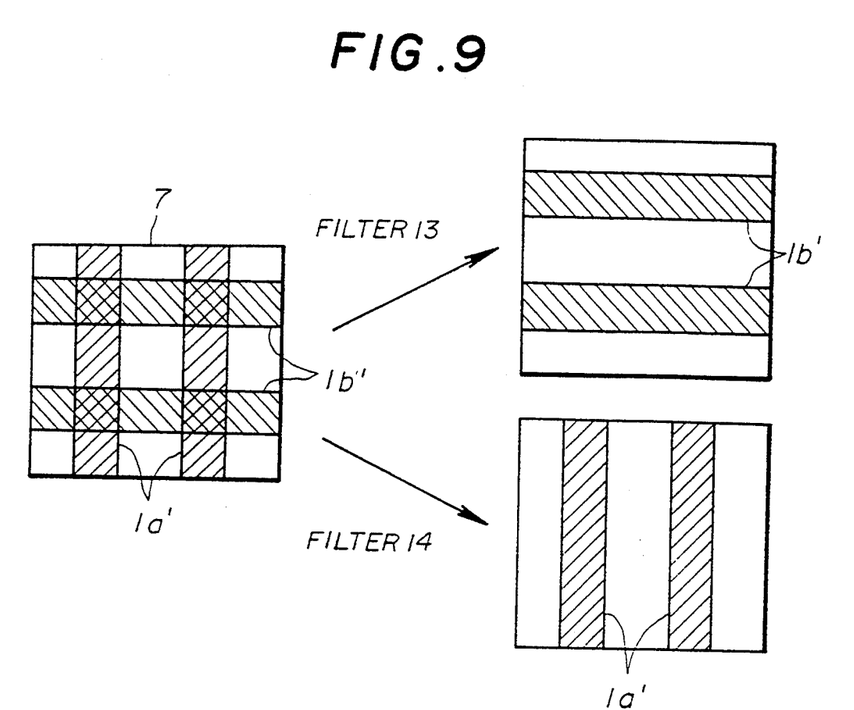
FIG. 9 is a diagram showing images formed on photoelectric conversion elements in the first embodiment.

The light from the screen 7 is transmitted through the filter 13, and thus, the photoelectric conversion elements 11 and 12 receive only the light having the wavelength $\lambda_0$. The light having the wavelength $\lambda_0$ is absorbed by the horizontal reference lines 1b on the tablet 1 but are not absorbed by the vertical reference lines 1a on the tablet 1. Accordingly, an image 1b' formed on the photoelectric conversion elements 11 and 12 has a stripe pattern shown in FIG. 9. In other words, the stripe pattern of the image 1b' has lines corresponding to the horizontal reference lines 1b due to the filtering effect of the filter 13.

On the other hand, the light from the screen 7 is also transmitted through the filter 14, and thus, the photoelectric conversion elements 8 and 9 receive only the light having the wavelength $\lambda_1$. The light having the wavelength $\lambda_1$ is absorbed by the vertical reference lines 1a on the tablet 1 but are not absorbed by the horizontal reference lines 1b on the tablet 1. Accordingly, an image 1a' formed on the photoelectric conversion elements 8 and 9 has a stripe pattern shown in FIG. 9. In other words, the stripe pattern of the image 1a' has lines corresponding to the vertical reference lines 1a due to the filtering effect of the filter 14.

As described above, the signal generation circuit 10 generates one electrical pulse with respect to a change of one period of each current flowing through the Photoelectric conversion elements 8 and 9 so that the electrical signal corresponding to the moving quantity of the tip of the pointing device 2 in the horizontal direction is obtained. Similarly, the signal generation circuit 10 generates one electrical pulse with respect to a change of one period of each current flowing through the photoelectric conversion elements 11 and 12 so that the electrical signal corresponding to the moving quantity of the tip of the pointing device 2 in the vertical direction is obtained. Furthermore, the signal generation circuit 10 compares the currents flowing through the photoelectric conversion elements 8, 9, 11 and 12 with the predetermined current, and detects whether the tip of the pointing device 2 is in contact with or is separated from the surface of the tablet 1 based on the results of the comparison.

Hence, the electrical signals output from the signal generation circuit 10 indicate the moving quantity of the pointing device 2 on the tablet 1 in the vertical direction, the moving quantity of the pointing device 2 in the horizontal direction, and the contact/separated state of the pointing device 2 with respect to the tablet 1. These electrical signals are input to the computer which thereby displays the position of the tip of the pointing device 2 on the tablet 1 as the cursor on the display. In this case, only the cursor is displayed if the tip of the pointing device 2 is separated from the surface of the tablet 1, and the cursor and its locus are displayed if the tip of the pointing device 2 is in contact with the surface of the tablet 1.

According to this first embodiment, light is used to detect the movement of the tip of the pointing device 2. For this reason, even if the tip of the pointing device 2 is separated from the surface of the tablet 1 by a certain distance of several mm, for example, it is still possible to detect the movement of the tip of the pointing device 2. In addition, since the pointing device 2 can make fine movements, it is possible to easily input minute graphics or the like. Moreover, since the contact between the tip of the pointing device 2 and the surface of the tablet 1 is detected without the use of a mechanical switch, it is possible to input intermittently written lines at a high speed, such as when inputting characters. In addition, the pen input device is easy to produce because of its simple construction. Furthermore, since the tablet 1 does not have a complex structure and may be formed by printing, for example.

Figure 10:
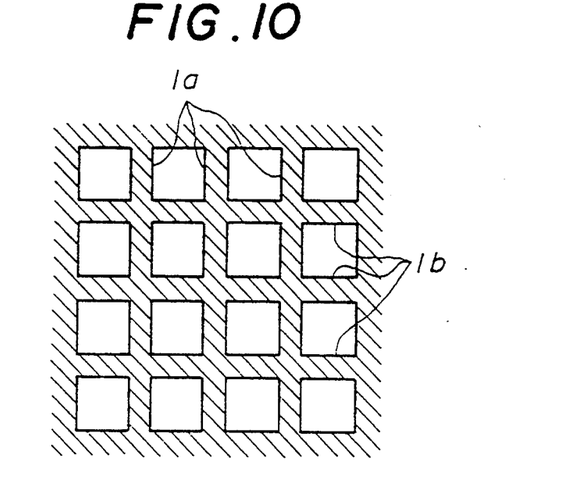
FIG. 10 is a plan view showing a part of a tablet of a second embodiment of the pen input device according to the present invention.
Figure 11:
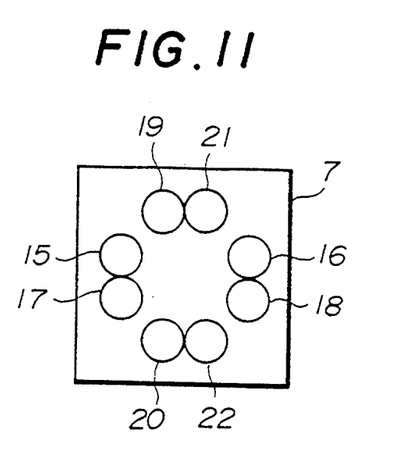
FIG. 11 is a diagram showing an essential part of an input pen of the second embodiment.

Next, a description will be given of a second embodiment of the pen input device according to the present invention, by referring to FIGS. 10 and 11. FIG. 10 shows a plan view of a tablet used in this embodiment, and FIG. 11 shows an arrangement of photoelectric conversion elements of a pointing device used in this embodiment. Only essential parts of this embodiment are shown in FIGS. 10 and 11 because other parts are basically the same as those of the first embodiment.

This embodiment uses a tablet 1 which has reference lines 1a and 1b arranged differently from those of the first embodiment, and a pointing device 2 having photoelectric conversion elements 15 through 22 arranged differently from those of the first embodiment. As a result, this embodiment is independent of the wavelengths of the light emitted from the light source 3 of the pointing device 2.

More particularly, 8 photoelectric conversion elements 15 through 22 are arranged on the screen 7, and no filters 13 and 14 are provided. The photoelectric conversion elements 15 through 18 are provided for detecting the movement of the tip of the pointing device 2 in the vertical direction. On the other hand, the photoelectric conversion elements 19 through 22 are provided for detecting the movement of the tip of the pointing device 2 in the horizontal direction.

The photoelectric conversion elements 15 and 17 and the photoelectric conversion elements 16 and 18 are respectively arranged at predetermined intervals along the vertical direction as shown in FIG. 11. In addition, the photoelectric conversion elements 15 and 16 and the photoelectric conversion elements 17 and 18 respectively confront each other along the horizontal direction with a predetermined interval therebetween. Similarly, the photoelectric conversion elements 19 and 21 and the photoelectric conversion elements 20 and 22 are respectively arranged at predetermined intervals along the horizontal direction as shown in FIG. 11. In addition, the photoelectric conversion elements 19 and 20 and the photoelectric conversion elements 21 and 22 respectively confront each other along the vertical direction with a predetermined interval therebetween.

As shown in FIG. 10, the reference lines 1a and 1b of the tablet 1 are drawn by an ink or the like including coloring matter which absorbs light. The reference lines 1a and 1b are basically the same as those of the first embodiment except for their width and pitch.

Similarly to the first embodiment, the light emitted from the light source 3 of the pointing device 2 is irradiated on the tablet 1 via the light blocking plate 4 and the tip end opening of the hollow body 110. Hence, a part of this light is absorbed by the reference lines 1a and 1b on the tablet 1. The light scattered by the tablet 1 is imaged on the screen 7 of the pointing device 2 via the tip end opening in the hollow body 110, the pin-hole in the pin-hole plate 5 and the lens 6. But in this case, the image formed on the screen 7 is detected directly by the photoelectric conversion elements 15 through 22.

The width of the images of the reference lines a and 1b formed on the screen 7 is set larger than the interval of (or distance between) the photoelectric conversion elements 15 and 17, the interval of the photoelectric conversion elements 16 and 18, the interval of the photoelectric conversion elements 18 and 21, and the interval of the photoelectric conversion elements 20 and 22. At the same time, the width of the images of the reference lines 1a and 1b formed on the screen 7 is set smaller than the interval of (or distance between) the photoelectric conversion elements 15 and 16, the interval of the photoelectric conversion elements 17 and 18, the interval of the photoelectric conversion elements 19 and 20, and the interval of the photoelectric conversion elements 21 and 22.

Accordingly, the photoelectric conversion elements 15 and 16 will not be simultaneously covered (or detected) by the image of the vertical reference line 1a, and the photoelectric conversion elements 17 and 18 will not be simultaneously covered by the image of the vertical reference line 1a. In addition, the photoelectric conversion elements 19 and 20 will not be simultaneously covered by the image of the horizontal reference line 1b, and the photoelectric conversion elements 21 and 22 will not be simultaneously covered by the image of the horizontal reference line 1b.

For the sake of convenience, a state in which either one of the reference lines 1a and 1b is detected by the photoelectric conversion elements 15 through 22 will be denoted by "1", and a state in which neither one of the reference lines 1a and 1b is detected by the photoelectric conversion elements 15 through 22 will be denoted by "0". In this case, if an operation X AND Y is regarded as "1" when both X and Y are "1" and is otherwise regarded as "0", a state of the photoelectric conversion elements 15 through 22 can be represented by (15 AND 16, 17 AND 18, 19 AND 20, 21 AND 22), where the numbers indicate the reference numerals of the respective photoelectric conversion elements 15 through 22. For example, if the tip of the pointing device 2 moves in the vertical direction from the top to the bottom, the following change occurs in the state of the photoelectric conversion elements 15 through 22, that is, the output signals of the photoelectric conversion elements 15 through 22, as the image of one horizontal reference line 1b traverses the screen 7, where "-" denotes a don't care or an undetermined state.

$$(0, 0, -, -) \to (1, 0, -, -) \to (1, 1, -, -) \to (0, 1, -, -) \to (0, 0, -, -)$$

Figure 12:
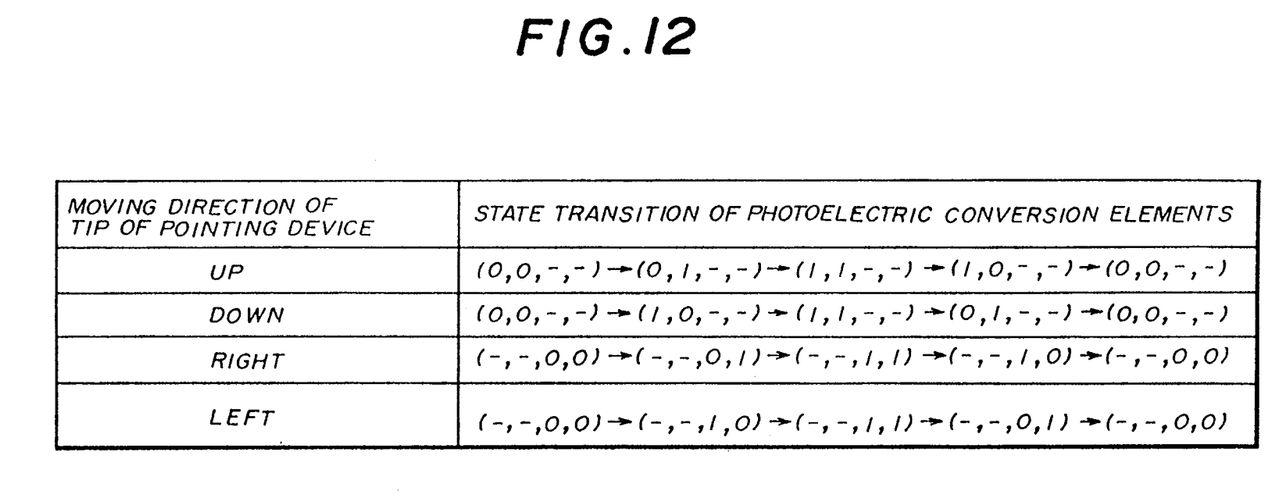
FIG. 12 is a diagram showing the relationship between a moving direction of the input pen and a state transition of an output signal of a photoelectric conversion element in the second embodiment.

The output signals of the photoelectric conversion elements 15 through 18 and 19 through 22 undergo periodic changes as shown in FIG. 12 also when the tip of the pointing device 2 moves in other directions. The signal generation circuit 10 generates one electrical pulse with respect to the periodic change of one cycle of the output signals of the photoelectric conversion elements 15 through 18 and 19 through 22, and generates an electrical signal corresponding to the magnitude of the movement of the tip of the pointing device 2, that is, corresponding to the number of reference lines a and 1b traversed by the tip of the pointing device 2.

In other words, with respect to the movement of the tip of the pointing device 2 in the vertical direction, the signal generation circuit 10 generates an electrical signal corresponding to the number of reference lines 1b traversed by the tip of the pointing device 2 with respect to the periodic change of one cycle of the output signals of the photoelectric conversion elements 15 through 18. In addition, with respect to the movement of the tip of the pointing device 2 in the horizontal direction, the signal generation circuit 10 generates an electrical signal corresponding to the number of reference lines 1a traversed by the tip of the pointing device 2 with respect to the periodic change of one cycle of the output signals of the photoelectric conversion elements 19 through 22.

Furthermore, the signal generation circuit 10 compares the currents flowing through the photoelectric conversion elements 15 through 22 with a predetermined current, and detects the contact or separation between the tip of the pointing device 2 and the tablet 1. Similarly to the first embodiment, the electrical signals output from the signal generation circuit 10 indicate the moving quantity of the tip of the pointing device 2 in the vertical direction with respect to the tablet 1, the moving quantity of the tip of the pointing device 2 in the horizontal direction, and the contacted/separated state of the pointing device 2 with respect to the tablet 1. These signals are input to the computer (not shown) which displays the position of the tip of the pointing device 2 on the tablet 1 by a cursor which is displayed on the display. In this case, only the cursor is displayed while the tip of the pointing device 2 is separated from the surface of the tablet 1, and both the cursor and its locus are displayed if the tip of the pointing device 2 is in contact with the surface of the tablet 1.

Figure 13:
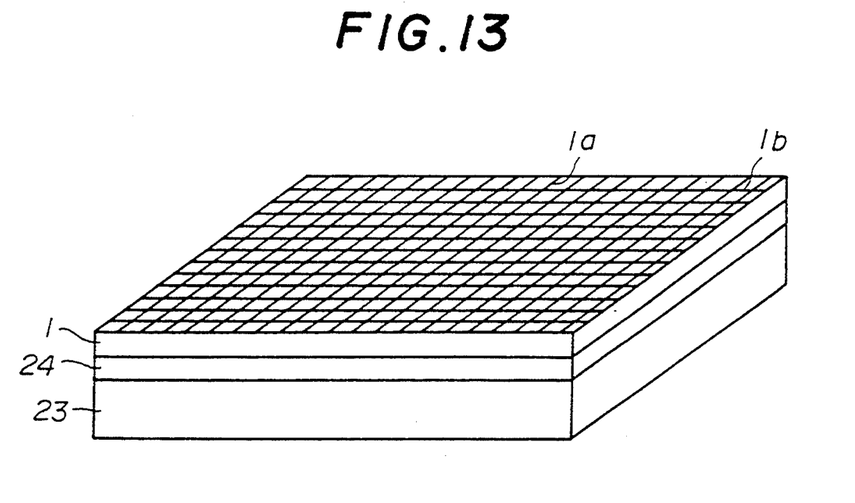
FIG. 13 is a perspective view showing a tablet of a third embodiment of the pen input device according to the present invention.

Next, a description will be given of a third embodiment of the pen input device according to the present invention, by referring to FIG. 13. FIG. 13 is a perspective view showing a tablet employed in this embodiment.

In FIG. 13, the tablet 1 is integrally formed on top of a display 23 via an infrared cutting filter 24 for absorbing infrared ray. For example, the display 23 is made of a LCD. In addition, although not shown in FIG. 13, the light source 3 of the pointing device 2 emits light having a wavelength different from the wavelength of the light such as the infrared ray which is used to display graphics or the like of the display 23.

The tablet 1 is made of a material which is transparent with respect to both the visible region and the infrared region. In addition, the reference lines 1a and 1b are written on the surface of the tablet 1 by an ink or the like which includes organic coloring matter or the like which satisfactorily scatters the infrared ray but is transparent in the visible region. The light which is irradiated on the reference lines 1a and 1b of the tablet 1 is scattered by the reference lines 1a and 1b, while the light which is irradiated on the tablet 1 at parts other than the reference lines 1a and 1b is transmitted through the tablet 1 and is absorbed by the infrared cutting filter 24.

For this reason, the change in the currents flowing through the photoelectric conversion elements 15 through 22 of the pointing device 2 becomes opposite to that of the second embodiment described above, but the operation of this third embodiment is otherwise basically the same as that of the second embodiment. In other words, the signal generation circuit 10 outputs electrical signals similar to those generated in the second embodiment, by taking into account that the change in the currents flowing through the photoelectric conversion elements 15 through 22 is opposite to that of the second embodiment.

When displaying the movement of the tip of the pointing device 2 on the display 23, the computer is set so that the direction and magnitude of the movement of the cursor become the same as the direction and magnitude of the movement of the tip of the pointing device 2. Hence, by matching the position of the tip of the pointing device 2 on the tablet 1 with the cursor position of the display 23 when moving the tip of the pointing device 2 towards the tablet 1, it becomes possible to display the graphics and characters on the display 23 at the same position where the tip of the pointing device 2 moves on tablet 1.

Further, the present invention is not limited to these embodiments, but various variations and modifications may be made without departing from the scope of the present invention.

What is claimed is:

1. A pen input device comprising:
   a) a tablet having a top surface, and a plurality of reference lines provided at a constant pitch on the top surface in mutually perpendicular directions; and
   b) a pointing device having:
      1) a tip end, 2) first means for radiating light on said tablet via the tip end, and
3) second means including a single sensor for detecting both A) and B) based on scattered light received from said tablet;
   A) a moving direction and a quantity of moving distance of the tip end of said pointing device on said tablet; and
   B) a distance between the tip end of said pointing device and the top surface of said tablet.

2. The pen input device as claimed in claim 1, wherein at least the top surface of said tablet is made of a material which causes isotropic scattering of the light irradiated from said pointing device, and the reference lines include a material which absorbs the light irradiated from said pointing device.

3. The pen input device as claimed in claim 1, wherein said second means of said pointing device generates a signal indicating one of first, second and third states, where the tip end of said pointing device is in contact with the top surface of said tablet in the first state, the tip end of said pointing device and the top surface of said tablet is separated by a distance which is within a predetermined range, and the tip end of said pointing device and the top surface of said tablet is separated by a distance exceeding said predetermined range.

4. The pen input device as claimed in claim 1, wherein said second means of said pointing device generates signal indicating the moving direction and quantity of moving distance of the tip end of said pointing device with respect to said tablet based on a change in an intensity of the scattered light received from said tablet.

5. The pen input device as claimed in claim 4, wherein said second means of said pointing device generates a signal indicating the moving direction and quantity of moving distance of the tip end of said pointing device with respect to said tablet based on a number of reference lines traversed by the light irradiated on said tablet.

6. The pen input device as claimed in claim 1, wherein said first means of said pointing device irradiates light including first and second wavelengths, and said reference lines include first reference lines which run in a vertical direction on the top surface of said tablet and absorb light having the first wavelength and second reference lines which run in a horizontal direction on the top surface of said tablet and absorb light having the second wavelength.

7. The pen input device as claimed in claim 6, wherein said second means of said pointing device includes filter means for separating the first and second wavelengths of the scattered light received from said tablet.

8. The pen input device as claimed in claim 1, which further comprises:
a display which is integrally formed on said tablet for displaying information based on output signals of said second means of said pointing device,
said tablet being transparent at least with respect to light used for displaying the information on said display.

9. The pen input device as claimed in claim 8, which further comprises:
a filter interposed between said tablet and said display for absorbing infrared ray,
said tablet being transparent with respect to both visible region and infrared region,
said reference lines on the top surface of said tablet scattering infrared ray and being transparent in the visible region.

10. The pen input device as claimed in claim 9, wherein said display is made up of a liquid crystal display.

11. The pen input device of claim 3, wherein:
in the first state, the locus of the cursor remains on a display when the tip of the pointing device is in contact with the top surface of said tablet;
in the second state, only the cursor and not the locus is displayed, depending on movement of the tip of the point device; and
in the third state, the cursor remains stationary on the display even if the tip of the pointing device is moved.

* * * * *